(12) United States Patent
Carter

(10) Patent No.: US 8,530,787 B2
(45) Date of Patent: Sep. 10, 2013

(54) FLOW TESTER FOR LASER DRILLED HOLES

(75) Inventor: Michael S. Carter, Loveland, CO (US)

(73) Assignee: Flow Systems, Inc., Berthoud, CO (US)

( * ) Notice: Subject to any disclaimer, the term of this patent is extended or adjusted under 35 U.S.C. 154(b) by 760 days.

(21) Appl. No.: 12/639,277

(22) Filed: Dec. 16, 2009

(65) Prior Publication Data

US 2011/0139752 A1 Jun. 16, 2011

(51) Int. Cl.
B23K 26/00 (2006.01)

(52) U.S. Cl.
USPC ........................................................ 219/121.7

(58) Field of Classification Search
USPC ....................................................... 219/121.7
See application file for complete search history.

(56) References Cited

U.S. PATENT DOCUMENTS

| 6,321,791 | B1 * | 11/2001 | Chow | 137/833 |
| 2002/0022283 | A1 * | 2/2002 | Bernard et al. | 438/14 |
| 2007/0113644 | A1 * | 5/2007 | Manaka et al. | 73/204.26 |
| 2011/0125423 | A1 * | 5/2011 | Allen et al. | 702/47 |
| 2012/0132313 | A1 * | 5/2012 | Bhatla et al. | 141/1 |

* cited by examiner

Primary Examiner — Fernando L Toledo
Assistant Examiner — Neil Prasad
(74) Attorney, Agent, or Firm — Russell S. Krajec; Krajec Patent Offices, LLC

(57) ABSTRACT

A flow tester may use a low impedance flow meter to test a hole at a predetermined Reynolds number. The flow tester may be mounted to a robot so that testing may be fully automated. For example, the flow tester may be incorporated into a laser drilling workcell and used to test flow characteristics of a test coupon or workpiece to calibrate or verify the laser settings. Another example may be used for testing flow characteristics of a finished workpiece. The flow tester may have a testing tip that is compliant to form a seal against a workpiece, and the testing tip may be able to seal against angled, curved, or other surfaces. The flow tester may be capable of testing individual holes or groups of holes and determining an effective cross sectional area for the hole at the predetermined Reynolds number.

20 Claims, 9 Drawing Sheets

100
SYSTEM FOR MEASURING FLOW

FLOW TESTER FOR LASER DRILLED HOLES

BACKGROUND

Laser drilling is a technique for forming holes in various materials, including hard to process materials such as aircraft grade castings. Laser drilling can be used to form very small holes, including holes that are created at an angle that may be otherwise very difficult to form.

Holes formed by laser drilling and other processes may be used to conduct gasses. For example, a turbine engine's turbine blades may have a series of holes through which cooling air may pass to form a cooled boundary layer around the blade. The flow of gasses through these holes can be a functional aspect of the blade that is difficult to measure.

SUMMARY

A flow tester may use a low impedance flow meter to test a hole at a predetermined Reynolds number. The flow tester may be mounted to a robot so that testing may be fully automated. For example, the flow tester may be incorporated into a laser drilling workcell and used to test flow characteristics of a test coupon or workpiece to calibrate or verify the laser settings. Another example may be used for testing flow characteristics of a finished workpiece. The flow tester may have a testing tip that is compliant to form a seal against a workpiece, and the testing tip may be able to seal against angled, curved, or other surfaces. The flow tester may be capable of testing individual holes or groups of holes and determining an effective cross sectional area for the hole at the predetermined Reynolds number.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
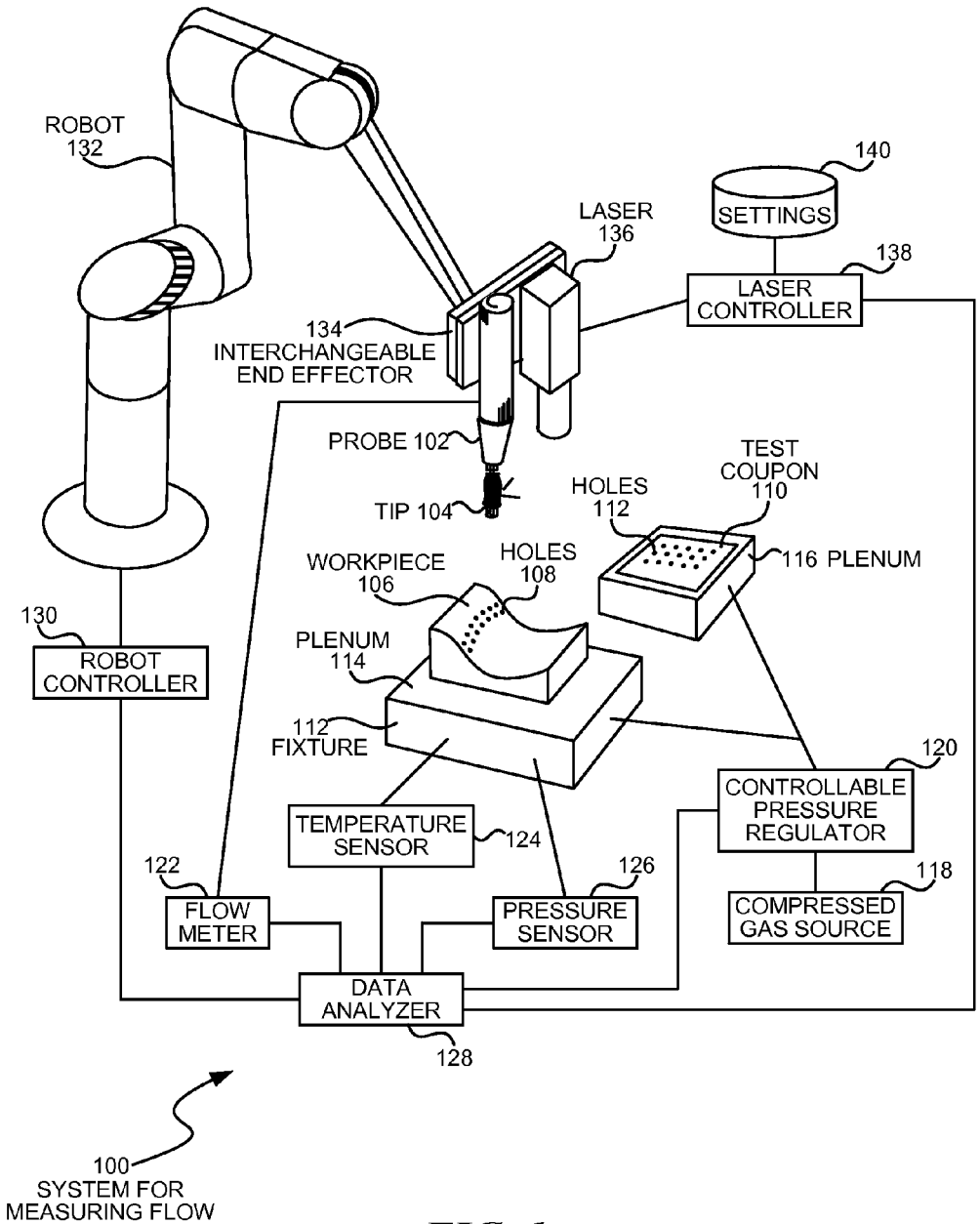
FIG. 1 is a diagram illustration of an embodiment showing a system for measuring flow.

A flow tester may use a low impedance flow meter to measure the flow from individual holes. The workpiece being tested may be mounted on a plenum that is pressurized to a predetermined pressure. The effective area of individual holes or groups of holes may be calculated knowing the pressure and temperature of the plenum as well as the pressure measured at a hole exit, the mass flow and the atmospheric pressure.

The flow tester may perform measurements on workpieces at a predetermined Reynolds number. The Reynolds number is a dimensionless number that gives a measure of the ratio of inertial forces to viscous forces in fluid flow, and quantifies the relative importance of the two types of forces for given flow conditions. Measurements taken in different conditions but with similar Reynolds numbers are often very comparable. Such a technique may be used when a device is used in situations that are difficult to simulate. For example, flow at very high temperatures or pressures may be evaluated using flow at similar Reynolds numbers but with room temperature flow, for example.

The flow tester may be integrated with a robotic manipulator. The robotic manipulator may position a test probe over individual holes to create a seal against a workpiece and capture the flow from the hole. After the flow parameters are measured, the robotic manipulator may position the flow tester over another hole.

Such a system may be useful in testing items that have many small holes. An example may be a blade from a turbine engine, where pressurized cold air may be forced through a series of small holes to form a cold boundary layer of air over the blade. Such blades may be used in the combustor section of a turbine engine and may be subjected to extreme temperature and pressure. The flow tester may be used to perform quality tests of the blades, for example.

In another use, the flow tester may be used in conjunction with a laser drilling operation. The flow tester may be used to measure the performance of the laser drilling operation and may be used to provide feedback to change or modify settings for the laser drilling operation. The flow tester may be used to measure the flow from a test coupon for setting the drilling settings or used for testing drilled holes in a workpiece.

An effective cross sectional area may be computed for a hole using the parameters collected by the flow tester. A low impedance flow sensor may measure the mass flow rate of the hole, and other sensors may measure flow path inlet pressure, flow path exit pressure, atmospheric pressure, and flow path inlet temperature.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system measuring flow. Embodiment 100 may be one example of an embodiment where a robotic manipulator may be used to position a probe over individual holes for testing.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a flow test system that may be used to measure flow from individual holes. A probe 102 may have a tip 104 that seals against a workpiece 106 to capture flow coming from one of the holes 108. In some cases, the probe 102 may be used to capture flow from holes 112 that may be drilled in a test coupon 110.

The workpiece 106 may be mounted in a fixture 112 that contains a plenum 114. Similarly, the test coupon 110 may be mounted in a fixture that contains a plenum 116. The respective plenums may be pressurized so that a gas flows from the holes 108 or 112 into the atmosphere. The probe 102 may be positioned over one or more holes to capture the air flowing from the plenum to the atmosphere.

A compressed gas source 118 may provide gas through a controllable pressure regulator 120 to pressurize the plenum 114 or 116. In some cases, the compressed gas may be air, while other cases helium, nitrogen, argon, or other gas may be used.

The probe 102 may be any mechanism that may be used to seal against the workpiece 106 or test coupon 110 to receive gas that may be expelled through one or more of the holes 108 or 112. The probe tip 104 may be a compliant mechanism that may seal around a hole. In many cases, the probe tip 104 may be sized so that a seal may be created around one hole without impinging on other holes.

In an embodiment that may test turbine blades, the hole sizing and spacing may be small. For example, a typical hole size may be 0.015-0.050 inches with spacing on the order of a 2 or 3 times the diameter of the hole. The holes may be arranged in a single line or in a pattern. Other embodiments may have larger or smaller holes and larger or smaller spacing, or place the holes in various configurations.

The holes may be perpendicular to the surface of a workpiece 106 or test coupon 110. In some cases, a laser drilling system may be capable of creating a hole at an angle to the surface of the workpiece. For example, some laser drilling systems may be able to create holes that are at 30 degrees, 45 degrees, 60 degrees, or at other angles to perpendicular.

The probe 102 may be connected to a flow meter 122. The flow meter 122 may be a low impedance flow meter, such as an inline flow meter, variable area flow meter, pitot tube flow meter, ultrasonic flow meter, or some other flow measurement device.

The probe 102 may have a tip 104 that may seal against the surface of a workpiece 106 or test coupon 110. The tip 104 may have one or more compliant elements that may allow the tip 104 to seal against angled or curved surfaces. In some cases, the tip 104 may have a portion that deforms to form a seal. Examples of different embodiments are illustrated later in this specification.

A temperature sensor 124 and pressure sensor 126 may be used by a data analyzer 128 to calculate an effective area of a hole. In many embodiments, the measurement system may be fully automated, and the flow meter 122, temperature sensor 124, and pressure sensor 126 may each generate digital or analog output signals that may be received by the data analyzer 128 to calculate an effective area. In many cases, the data analyzer 128 may also control the controllable pressure regulator 120 to generate a desired pressure within the plenums 114 or 116.

The temperature sensor 124 and pressure sensor 126 are illustrated as being connected to the fixture 112. In embodiments where the holes 112 are to be tested in the test coupon 110, similar temperature and pressure sensors may be connected to the plenum 116.

The effective area of a hole may be calculated using the following formulae:

$$AE_{hole} = \frac{mdot * T_3^{(1/2)}}{0.91886 * P_3 * M * (1 + 0.2 * M^2)^{-3}}$$

$$M = \left[\frac{(PR^{(1/3.5)} - 1)}{0.2}\right]^{1/2}$$

$$PR = \frac{P_3}{P_a + P_4}$$

where:
$AE_{hole}$=Effective Area (in$^2$)
m dot=Mass Flow Rate (lbm/sec)
T3=Flow Path Inlet Temperature (deg F.)
M=Mach Number (unit less)
PR=Pressure Ratio (unit less)
Pa=Atmospheric Pressure (psia)
P4=Flow Path Exit Pressure (psia)
P3=Flow Path Inlet Pressure (psia)

The formulae above may be used to compute the effective area of a hole based using English units. Similar formulae may be used for SI units.

The temperature sensor 124 may be used to measure the T3 value. The P4 value may be measured using the flow meter 122, and the P3 value may be measured using the pressure sensor 126 in the example of embodiment 100.

In many embodiments, the flow meter 122, temperature sensor 124, and pressure sensor 126 may generate digital signals corresponding with the units above. In some cases, the data analyzer 128 may perform unit conversions to convert a received signal to a value corresponding with the desired units.

The test system may operate by causing a pressure within the plenum 114 to reach a predetermined level. The pressure may cause flow through the holes 108 to atmospheric pressure. The probe 102 may be placed over each of the holes in succession and while sealed to a hole, the various pressure and temperature measurements may be taken and used to calculate an effective area for the hole. Once the measurements are taken, the probe 102 may be repositioned over another hole and another set of measurements taken. This process may repeat for each of the holes 108.

The test system may operate by determining a desired Reynolds number for the workpiece 106. The Reynolds number may be calculated for the intended use for the workpiece, then a comparable Reynolds number flow may be calculated using the flow system of embodiment 100. In some cases, the test flow may exhaust to atmospheric pressure and room temperature gas may be used.

In order to create a similar Reynolds number flow for testing, the pressure inside a plenum of a test fixture or test coupon holder may be set to a desired pressure. In some embodiments, a gas heating or cooling system may be used to respectively raise or lower the gas pressure inside the plenum to achieve a desired Reynolds number flow.

The Reynolds number may be affected by the compressed gas used in the test system. In some cases, air may be used as the compressed gas, but other gases may also be used.

The data analyzer 128 may operate in conjunction with a robot controller 130 that may cause the robot 132 to move the probe 102 into position. The robot controller 130 may generate tool paths and movement signals to cause the probe 102 to move from one hole location to another.

The data analyzer 128 and robot controller 130 may have a master/slave relationship. In some embodiments, the robot controller 130 may be configured to sequence the movement of the probe 102 and testing of the holes 108. In such an embodiment, the robot controller 130 may position the probe 102, then send a signal to the data analyzer 128, which may cause the data analyzer 128 to perform the test. After performing the test, the data analyzer 128 may send a signal to the robot controller 130 to resume the sequence. In such an embodiment, the robot controller 130 may act as a master device while the data analyzer 128 may act as a slave device to the robot controller 130.

In other embodiments, the data analyzer 128 may operate as a master device and the robot controller 130 may operate as a slave device. In such an embodiment, the data analyzer 128 may send a signal to the robot controller 130 to move to a designated location. Once the robot controller 130 is in position, the robot controller 130 may transmit a signal to the data analyzer 128 and the data analyzer 128 may perform the tests. In some such embodiments, the data analyzer 128 may contain a list of positions for each of the holes 108 and may transmit addresses or coordinates of those holes to the robot controller 130.

The robot 132 may be any positioning device. The robot 132 as illustrated may be a robot arm that has several degrees of motion. The robot 132 may be capable of positioning the probe 102 in any position and at any angle within the robot's reach. In many such robots, the probe 102 may be positioned within a three dimensional space by defining a point and a vector within the three dimensional space. The point may define the position of the end of the tip 104, and the vector may define the orientation of the probe 102 from the point.

In some embodiments, the robot 132 may have an interchangeable end effector 134. An interchangeable end effector may be a mechanism by which the robot 132 may be able to change tools or end effectors quickly. In some embodiments, the robot 132 may be able to detach the probe 102 and use another end effector, then detach the other end effector and re-attach the probe 102. In many such embodiments, the interchangeable end effector 134 may have connections for pressurized air and electronics, as well as sensor connections such as a connection to the flow meter 122. In some embodiments, an end effector may include a flow meter 122 and may pass flow measurements to the data analyzer 128 through an electrical connection in the interchangeable end effector 134.

A laser 136 may be incorporated into the robotic system for drilling the various holes 108 or 112, and may be used in several different manners with the data analyzer 128 and other sensors. In some embodiments, a single robotic end effector may include a probe 102 and a laser 136. In other embodiments, a robot may have two separate end effectors: a probe 102 and a laser 136. In still other embodiments, a laser drilling machine may have a first robot that manipulates and positions a laser 136 while a second robot manipulates and positions a probe 102.

In one embodiment, the laser 136 may be a component in a laser drilling system. The laser drilling system may have a laser controller 138 that operates the laser 136 using various laser drilling settings 140. The data analyzer 128 and probe 102 may be used to configure the settings 140 by providing feedback on holes drilled by the laser 136.

In such an embodiment, the laser 136 may be used to drill one or more holes. The probe 102 and data analyzer 128 may be used to measure the flow of the holes and to analyze the effective area of the holes. The data analyzer 128 may compare the measured results of the hole to expected results to determine if the settings 140 may be adjusted. The expected results may have a range of expected values so that when an expected value falls within the range, the settings may be left unchanged. In many such embodiments, the data analyzer 128 may measure the effective area of a hole and cause the settings 140 to be adjusted to make the hole larger or smaller to fit within the expected range of the effective area of the hole.

The system may first calibrate the laser settings 140 by using a test coupon 110. The laser 136 may be used to drill several holes in the test coupon 110, then the probe 102 may be used to measure each hole. Based on the measurements, the laser settings 140 may be adjusted. Some embodiments may perform the calibration routine again until the laser settings are producing expected results. In some cases, such setting adjustment routines may be performed iteratively until the settings converge on an acceptable set of values.

The laser settings 140 may be any adjustable values that may be used to cause the laser 136 to perform in a different manner. The adjustments may be, for example, power levels, focus settings, length of a percussive blast, number of percussive blasts, or other configurable settings.

When the laser 136 is used for drilling very small holes, the laser 136 may be positioned in a single location and the laser may be fired several times to produce a hole. Such a laser drilling system may be termed a percussive drilling mechanism. In such systems, the energy levels, timing, and duration of the percussive blasts may change the overall size of the holes.

The holes drilled by such a system may have rather irregular shapes. The manufacture of the holes involves successively blasting the workpiece with laser energy that may vaporize or blast the base material away. While the hole is generally round, the size of the hole may be difficult to measure using pin gages or other mechanical measuring system. In such cases, the embodiment 100 may be used to measure the holes using conditions that are similar to the end use of the workpiece and by calculating the effective area of the holes. By measuring in these conditions, the measurements better reflect the performance of the workpiece in terms of effective area of flow rather than pure dimensional measurements that may be obtained with conventional physical measurement techniques such as using pin gages, for example.

Such systems may be used to drill holes that may be otherwise difficult to manufacture. For example, turbine blades may be manufactured from very exotic and hard to machine materials. A conventional twist drill may dull or fail when used in such materials, especially for very small hole sizes. For holes drilled at an angle, the complexities may increase further. In some cases, laser drilling may be the only alternative for producing such holes.

When the laser 136 is used for drilling larger holes, the laser 136 may first break through the workpiece, then the laser 136 may be moved in a circular manner over the workpiece to create a hole. In such embodiments, the data analyzer 128 may be used to calculate the effective area of the hole. After comparing the effective area of the hole and any deviation from an expected effective area, the data analyzer 128 may cause the laser settings 140 or the robot path settings to change. In some embodiments, the data analyzer 128 may cause both of the laser settings 140 and the robot path to change. In such an embodiment, the robot path may be adjusted to make the effective area larger or smaller, while the laser settings 140 may be adjusted to remove more or less material.

Figure 2:
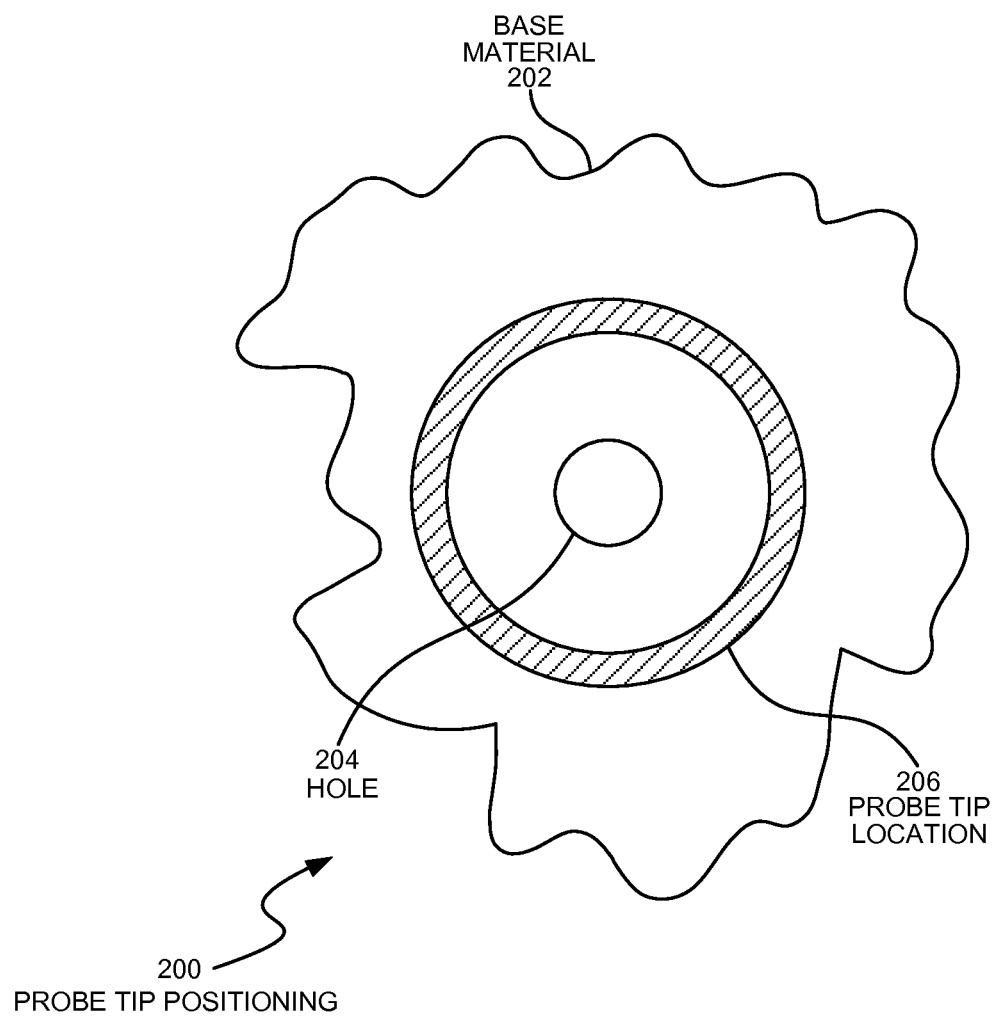
FIG. 2 is a diagram illustration of an embodiment showing a probe tip and concentric positioning of the probe tip.

FIG. 2 is a diagram of an embodiment 200, showing a hole to be measured and the positioning of a probe tip to measure the hole.

The base material 202 is illustrated with a hole 204. The probe tip 206 is illustrated as being centered or concentric with the hole 204. In many cases, the concentric placement of the probe tip 206 may be the ideal condition when attempting to measure the flow from the hole 202.

The shaded area of the probe tip 206 may illustrate the contact area for a probe tip against the base material 202 when the probe forms a seal against the base material 202.

The base material 202 may be the material of a test coupon or workpiece. The hole 204 is illustrated as being circular. In some embodiments, the hole 204 may be irregularly shaped.

Figure 3:
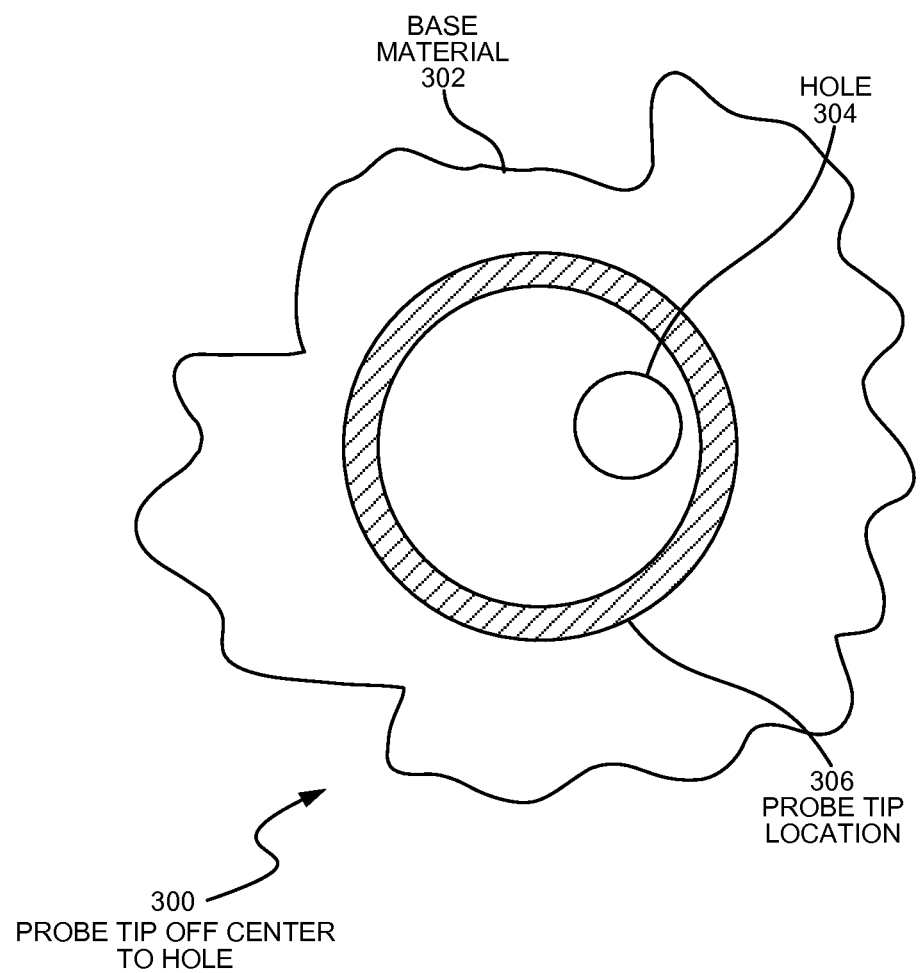
FIG. 3 is a diagram illustration of an embodiment showing a probe tip and non-concentric positioning of the probe tip.

FIG. 3 is a diagram of an embodiment 300, showing a hole to be measured and the positioning of a probe tip to measure the hole. Embodiment 300 is an example of an off-centered placement of the probe tip.

The base material 302 is illustrated with a hole 304. The probe tip 306 is illustrated as being off centered or not concentric entered or concentric with the hole 304.

In some cases, the probe tip 306 may be positioned off center with respect to the hole 304. Such a situation may occur due to tolerances in the positioning of the probe tip, or due to tolerances in positioning the base material 302 or in drilling the base material 302.

Figure 4:
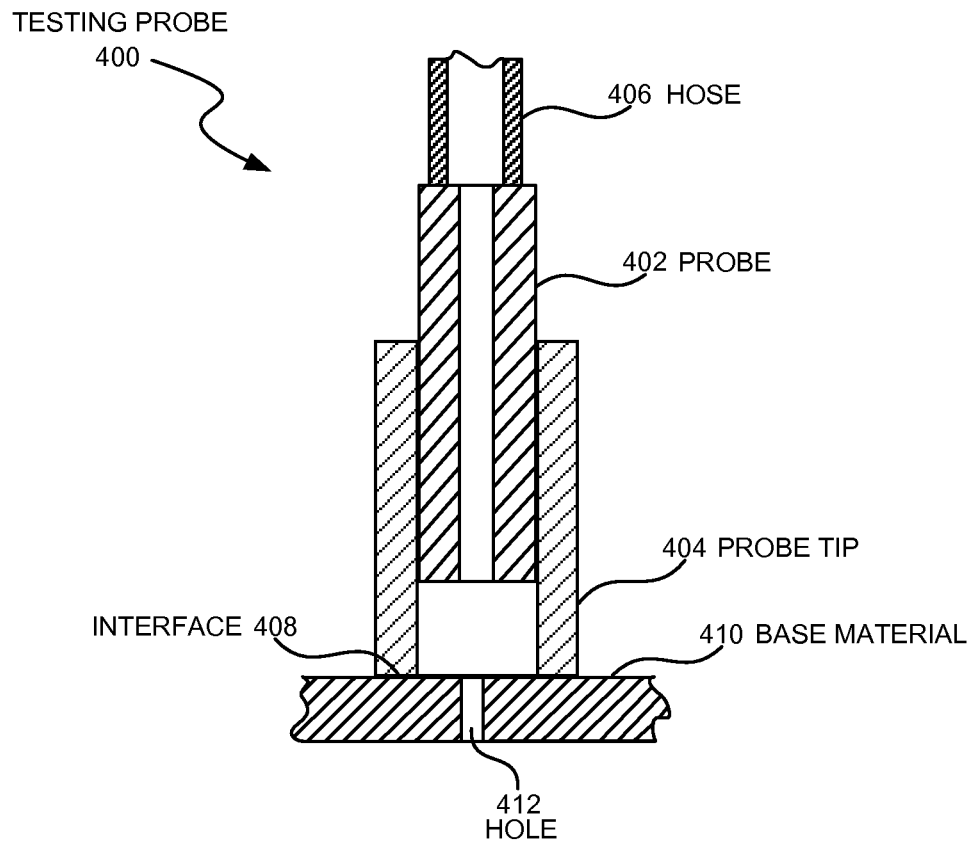
FIG. 4 is a cross-sectional diagram illustration of an embodiment showing a testing probe.

FIG. 4 is a cross sectional view of an embodiment 400 showing a testing probe.

The view of embodiment 400 is a schematic cross section that illustrates the functional components of a probe. Actual embodiments may have different sizes and proportions of the various components. Because the view shows some functional components, many details have been removed, including other parts, connection mechanisms, and the like.

The probe 402 is illustrated as having a probe tip 404 and a hose 406. The probe 402 is also illustrated as having a hollow core that may conduct air or other fluid from a hole 412 through the hose 406. The hose 406 may be connected to a flow meter.

The probe 402 has a probe tip 404 that may press against the base material 410 to form a seal at the interface 408. The seal may pass the pressurized air or other fluid through the hose 406.

In many embodiments, the probe tip 404 may affect a seal at the interface 408 when compressive force is applied to the probe 402. In some cases, the probe tip 404 may deform or may contain deformable components so that a fluid-tight seal may be created to the base material 410.

Figure 5:
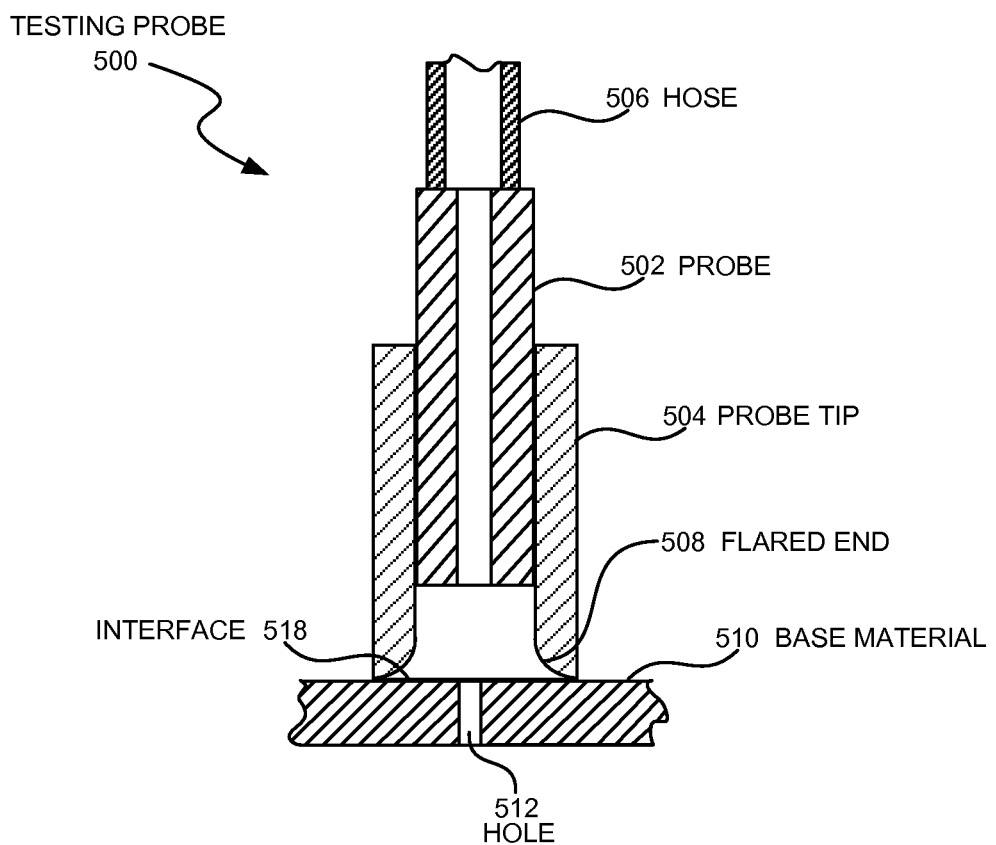
FIG. 5 is a cross-sectional diagram illustration of an embodiment showing a testing probe with a compliant probe tip.

FIG. 5 is a cross sectional view of an embodiment 500 showing a testing probe with a deformable tip.

The view of embodiment 500 is a schematic cross section that illustrates the functional components of a probe. Actual embodiments may have different sizes and proportions of the various components. Because the view shows some functional components, many details have been removed, including other parts, connection mechanisms, and the like.

The probe 502 is illustrated as having a probe tip 504 and a hose 506. Like embodiment 400, the probe 502 is illustrated as having a hollow care that may conduct air or other fluid from a hole 512 through the hose 506. The hose 506 may be connected to a flow meter.

The probe 502 has a probe tip 504 that may have a flared end 508. The flared end 508 may be pressed against the base material 510 to form a seal that the interface 518.

Figure 6:
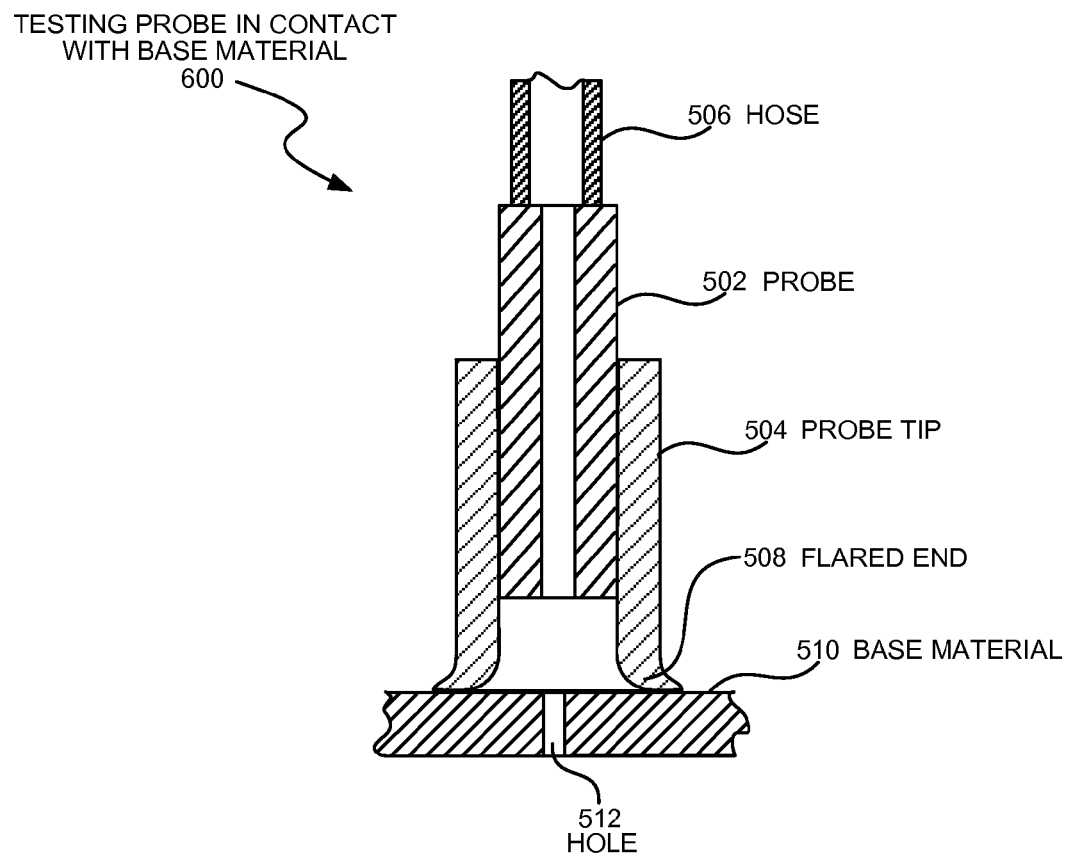
FIG. 6 is a cross-sectional diagram illustration of an embodiment showing the testing probe of FIG. 5 with the compliant probe tip deformed against a base material.

FIG. 6 is a cross sectional view of an embodiment 600 showing the probe of embodiment 500 pressed against the base material.

The view of embodiment 600 is a schematic cross section that illustrates the functional components of a probe. Actual embodiments may have different sizes and proportions of the various components. Because the view shows some functional components, many details have been removed, including other parts, connection mechanisms, and the like.

Embodiment 600 shows the probe 502 of embodiment 500 pressed against the base material 510. When the probe 502 is pressed against the base material 510, the flared end 508 may be deformed as illustrated. The deformation may be sufficient to seal the probe 502 against the base material 510.

In the example of embodiments 500 and 600, the probe tip 504 may be manufactured of a pliable material, such as polyurethane or other compliant plastic material. Such probe tips may be machined, cut, or formed into a shape with a flared end. In some designs, the probe tip 504 may be slid over the probe 502 and may be held together by an interference fit, which may also serve to seal the interface between the probe 502 and the probe tip 504.

Figure 7:
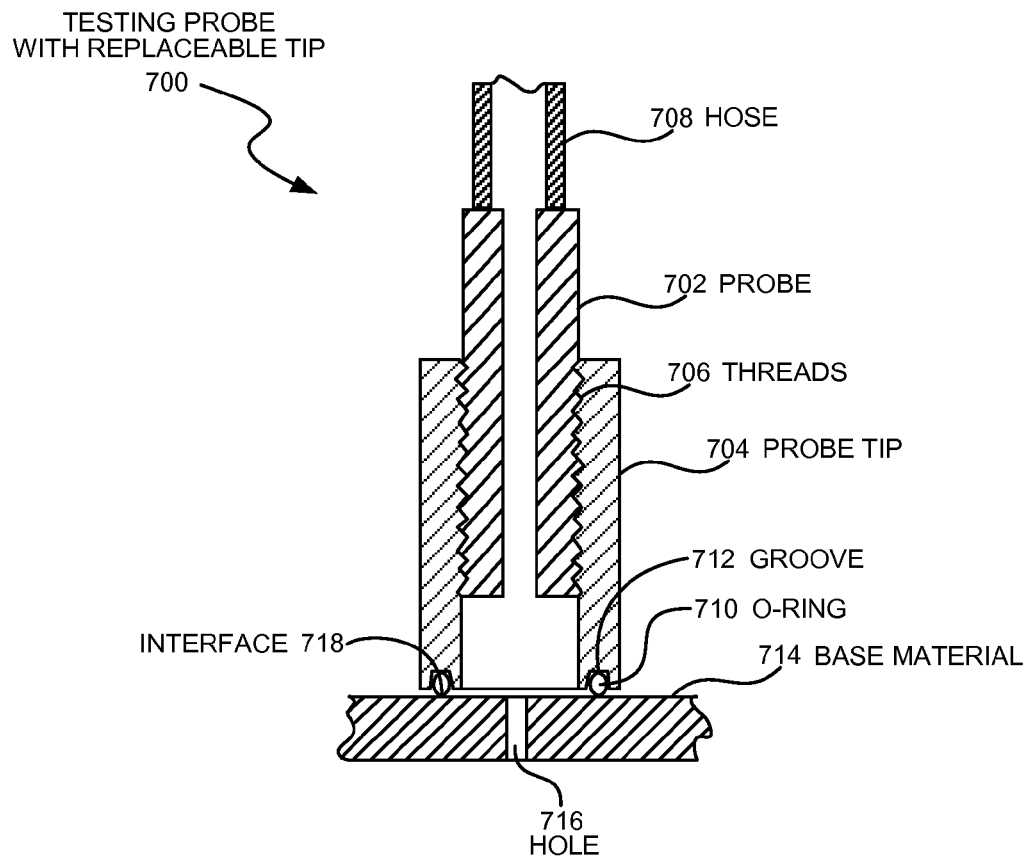
FIG. 7 is a cross-sectional diagram illustration of an embodiment showing a testing probe with a first removable probe tip.

FIG. 7 is a cross sectional view of an embodiment 700 showing a probe with a replaceable tip.

The view of embodiment 700 is a schematic cross section that illustrates the functional components of a probe. Actual embodiments may have different sizes and proportions of the various components. Because the view shows some functional components, many details have been removed, including other parts, connection mechanisms, and the like.

A probe 702 is illustrated as having a probe tip 704 that may be connected to the probe 702 by a set of threads 706. The probe tip 704 may form an interface 718 to a base material 714 with an O-ring 710. The probe tip 704 may have a groove 712 to receive the O-ring 710.

The probe 702 may form a seal around the hole 716 by compressing the O-ring 710 against the surface of the base material 714. In many embodiments, the interface 718 may be created by a dry contact between the O-ring 710 and the base material 714. Some embodiments may use vacuum grease or other material along the interface 718 to create or assist in creating a seal.

The probe tip 704 may be a removable and replaceable probe tip. Embodiment 800 illustrates a different probe tip configuration.

The probe tip 704 is illustrated as being connected to the probe 702 by a set of threads 706. Such embodiments may be assembled by twisting the probe tip 704 onto the probe 702. Other embodiments may have different engagement mechanisms, including a sliding fit, interference fit, or other mechanical engagement mechanisms.

Figure 8:
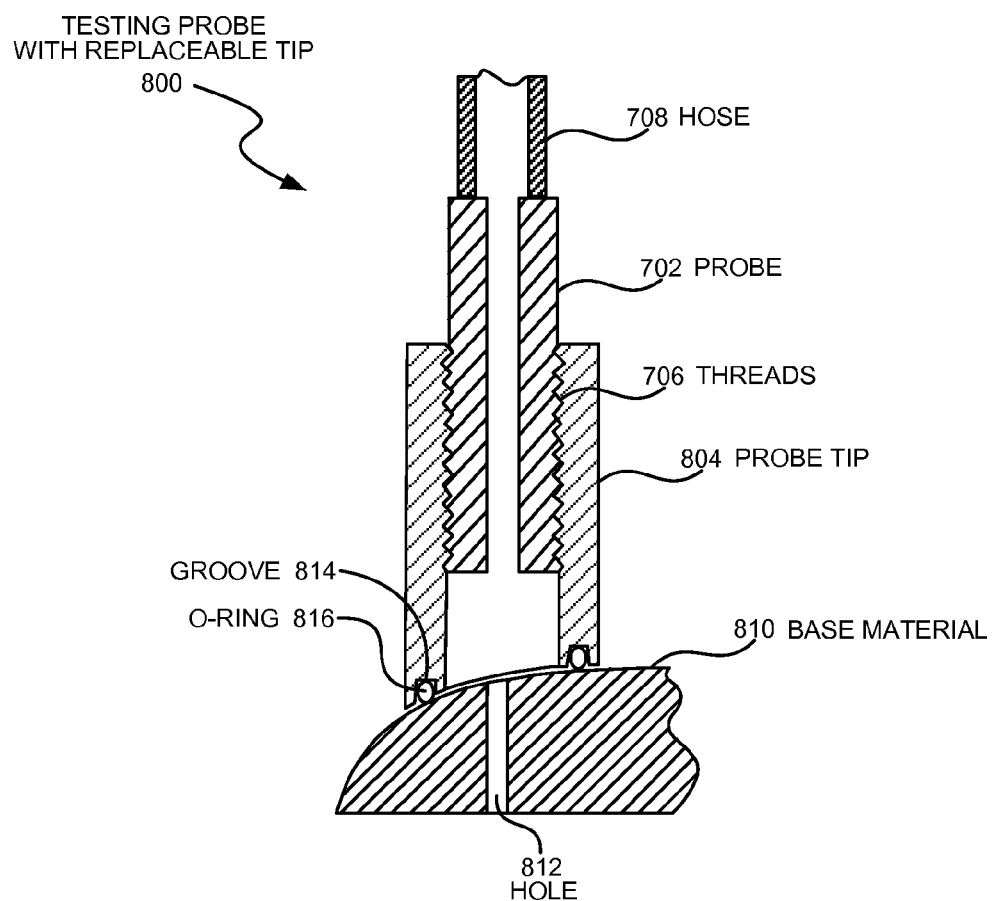
FIG. 8 is a cross-sectional diagram illustration of an embodiment showing a testing probe with a second removable probe tip.

FIG. 8 is a cross sectional view of an embodiment 800 showing a probe with a replaceable tip. Embodiment 800 may illustrate the probe of embodiment 700 with a different type of probe tip.

The view of embodiment 800 is a schematic cross section that illustrates the functional components of a probe. Actual embodiments may have different sizes and proportions of the various components. Because the view shows some functional components, many details have been removed, including other parts, connection mechanisms, and the like.

The probe 702 is illustrated as having a probe tip 804 that is curved or irregularly shaped. The probe tip 804 is illustrated as being connected to the probe 702 using the screw threads 706.

The probe tip 804 is curved to match the approximate shape of the base material 810 in the region of the hole 812. The probe tip 804 may have a groove 814 in which an O-ring 816 may be placed.

Embodiment 800 may create a seal between the O-ring 816 and the base material 810 when the probe 702 is pressed against the base material 810.

The probe tip 804 may be used in cases where the base material 810 has a shape that cannot be sealed using a different type of probe tip. In many complex parts, the shape of the base material 810 may be a compound curve, for example.

Some embodiments may have several different probe tips that have special shapes, where each of the shapes may be used in specially contoured sections of a workpiece. In such embodiments, the probe tip 804 may be configured to be quickly and easily replaceable. Some robotic embodiments may have an automated mechanism for replacing the probe tips 804 to test different holes in a single workpiece.

Figure 9:
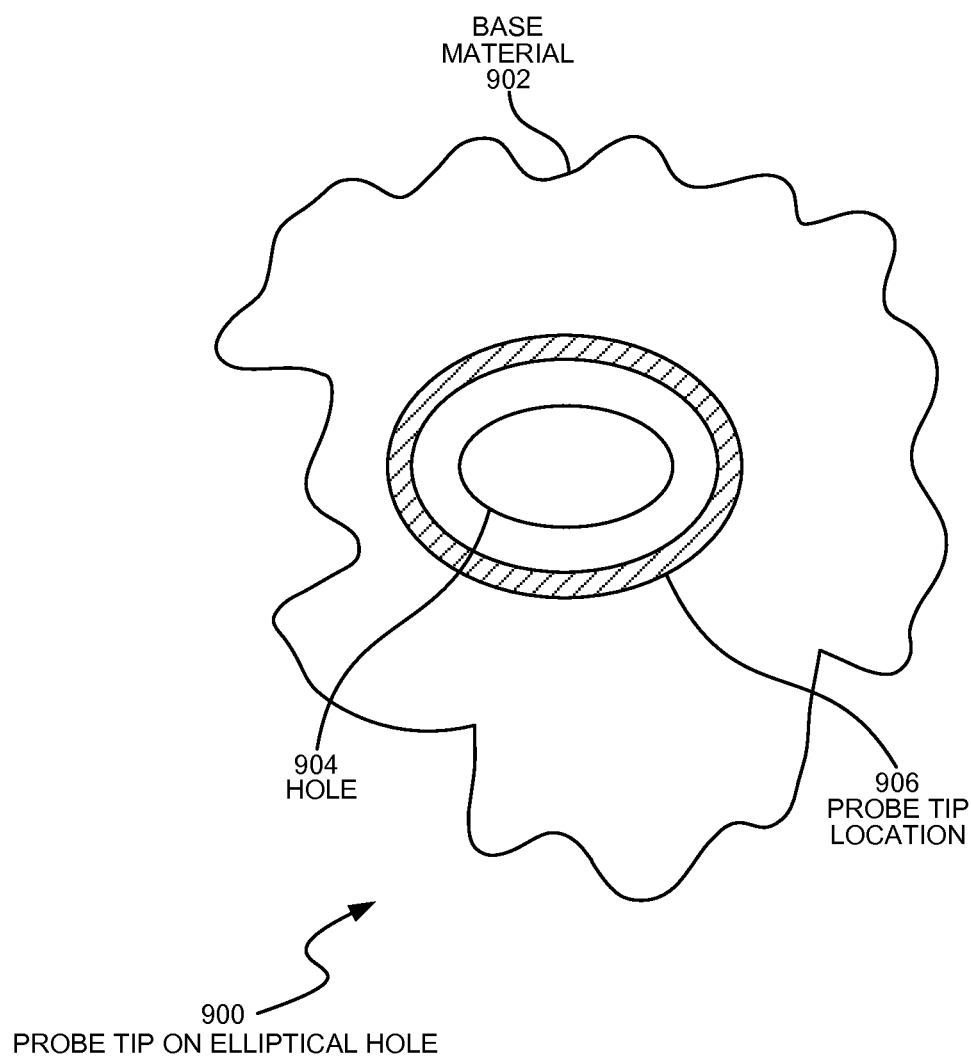
FIG. 9 is a diagram illustration of an embodiment showing a probe tip and concentric positioning of the probe tip, where both the probe tip and hole to be measured are elliptical.

FIG. 9 is a diagram of an embodiment 900, showing a hole to be measured and the positioning of a probe tip to measure the hole. The hole and probe tip are illustrated as irregularly shaped.

The base material 902 is illustrated with a hole 904. The probe tip 906 is illustrated as being centered or concentric with the hole 904.

The illustration of embodiment 900 shows both the hole 904 and the probe tip 906 as being elliptical. Such a condition may occur when the hole 904 may be a circular hole drilled at an angle. The condition may also occur when the hole is cut as an elliptical shape. Laser cutting machines may be configured to cut an elliptical hole by moving the laser in an elliptical shaped path during the cutting process.

The elliptical shape illustrated in embodiment 900 may represent any shape of hole that may be tested.

Embodiment 900 illustrates a test probe that has a shape that closely resembles the shape of the hole being tested. Other embodiments may use any shaped probe to test any shaped hole, provided that the test probe form a seal around the periphery of the hole.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
    a compressed gas input;
    a plenum connected to said compressed gas input and forming a sealed connection to a workpiece, said workpiece having a plurality of holes;
    a flow meter having a gas input and further having a signal output;
    a test probe connected to said gas input of said flow meter, said test probe comprising a compliant tip;
    a robotic manipulator that sequentially aligns said test probe with each of said plurality of holes so that said compliant tip creates a seal against said workpiece;
    a programmable controller that creates signals transmitted to said robotic manipulator that control movement of said robotic manipulator; and
    a data analyzer that determines an effective area of each of said holes based in part on said signal output of said flow meter.

2. The system of claim 1 further comprising:
    a temperature sensor connected to said plenum and measuring gas temperature inside said plenum, said temperature sensor having a temperature output, said temperature output being connected to said data analyzer.

3. The system of claim 2 further comprising:
a pressure sensor connected to said plenum and measuring gas pressure inside said plenum, said pressure sensor having a pressure output, said pressure output being connected to said data analyzer.

4. The system of claim 3, said flow meter being an inline flow meter.

5. The system of claim 3, said flow meter comprising a variable area flow meter.

6. The system of claim 3, said flow meter comprising a pitot tube flow meter.

7. The system of claim 3, said test probe being removably attached to said robotic manipulator.

8. The system of claim 7, said test probe being attached using a removable end effector for said robotic manipulator.

9. The system of claim 1, said compressed gas being air.

10. A laser drilling system comprising:
a mounting mechanism that holds a first workpiece;
a laser;
a laser controller that controls said laser to drill holes in said workpiece, said laser controller having a set of controllable settings;
a robotic manipulator that positions said laser with respect to said first workpiece to drill holes in said first workpiece;
a compressed gas input;
a plenum connected to said compressed gas input and forming a sealed connection to a second workpiece;
a flow meter having a gas input and further having a signal output;
a temperature sensor connected to said plenum and measuring gas temperature inside said plenum, said temperature sensor having a temperature output;
a pressure sensor connected to said plenum and measuring gas pressure inside said plenum, said pressure sensor having a pressure output;
a test probe connected to said gas input of said flow meter, said test probe comprising a compliant tip, said test probe being mountable on said robotic manipulator;
a programmable controller that creates signals transmitted to said robotic manipulator that control movement of said robotic manipulator; and
a data analyzer that determines a measured effective area of each of said holes based in part on said signal output of said flow meter, said temperature output, and said pressure output.

11. The laser drilling system of claim 10, said data analyzer further comparing said measured effective area to an expected effective area and generating a variance.

12. The laser drilling system of claim 11, said variance being used to adjust said set of controllable settings by said laser controller.

13. The laser drilling system of claim 12, said second workpiece being a test coupon.

14. The laser drilling system of claim 12, said first workpiece and said second workpiece being the same piece.

15. The laser drilling system of claim 14, said mounting mechanism comprising said plenum.

16. The laser drilling system of claim 10, said test probe being removably connected to said robotic manipulator.

17. The laser drilling system of claim 16, said robotic manipulator having interchangeable end effectors.

18. The laser drilling system of claim 17, said laser being mounted on one of said interchangeable end effectors.

19. The laser drilling system of claim 10, said test probe and said laser being mounted to said robotic manipulator simultaneously.

20. The laser drilling system of claim 10, further comprising:
a pressure regulator connected to said compressed gas input and having an input, said data analyzer determining a pressure setting for said pressure regulator and causing said pressure regulator to meet said pressure setting by transmitting a signal to said input on said pressure regulator.

* * * * *